INVENTOR
BURTON S. AIKMAN
BY *Wm. M. Cady*
ATTORNEY

March 8, 1938. B. S. AIKMAN 2,110,691
COMPRESSOR VALVE
Filed March 21, 1936 2 Sheets-Sheet 2
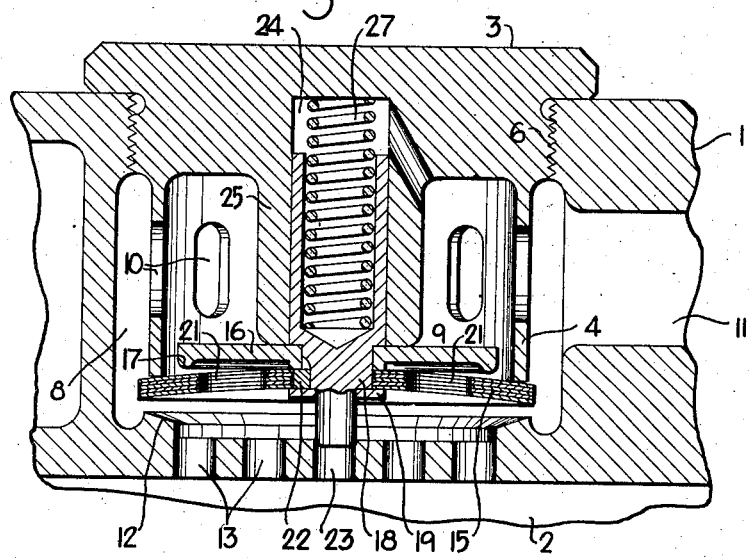
Fig. 3
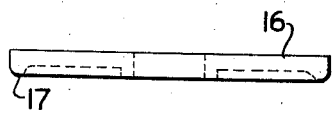
Fig. 4
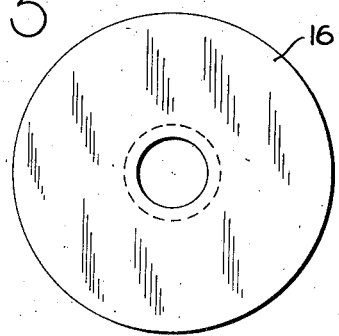
Fig. 5
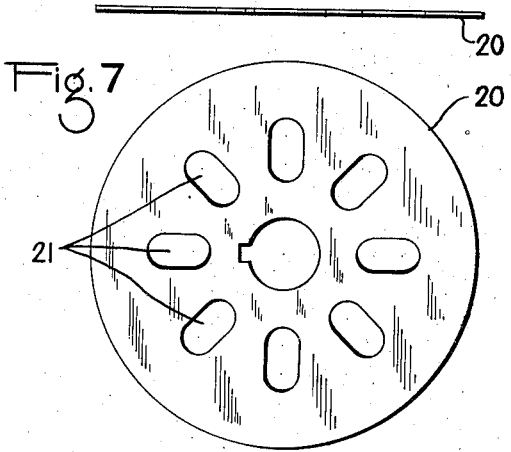
Fig. 6
Fig. 7
INVENTOR
BURTON S. AIKMAN
BY *Wm. M. Cady*
ATTORNEY Patented Mar. 8, 1938

2,110,691

UNITED STATES PATENT OFFICE 2,110,691

COMPRESSOR VALVE

Burton S. Aikman, Wilkinsburg, Pa., assignor to The Westinghouse Air Brake Company, Wilmerding, Pa., a corporation of Pennsylvania Application March 21, 1936, Serial No. 70,134

15 Claims. (Cl. 277—44)

This invention relates to fluid compressors, and more particularly to a valve mechanism for a compressor.

The principal object of my invention is to provide an inexpensive valve mechanism adaptable for use as the inlet valve or the discharge valve of a compressor, and which is capable of quiet and efficient operation at various speeds and pressures.

Another object of my invention is to provide a valve mechanism operative with a minimum normal valve movement under a relatively slight differential in the fluid pressures acting thereon, and which is arranged to effect variation in the flow capacity thereof in accordance with the pressure and speed of fluid supplied by way of said valve mechanism.

Another object is to provide a valve mechanism of the above type having a laminated valve element adapted to minimize or prevent undesirable noise of operation at both limits of the valve movement, said laminated valve element being constructed and arranged to avoid undue strain thereon apt to result from high fluid pressures.

A further object of the invention is to provide a valve mechanism having a valve seat adapted to be automatically polished or cleaned by a slight wiping action of the valve element during operation thereof.

Figure 1:
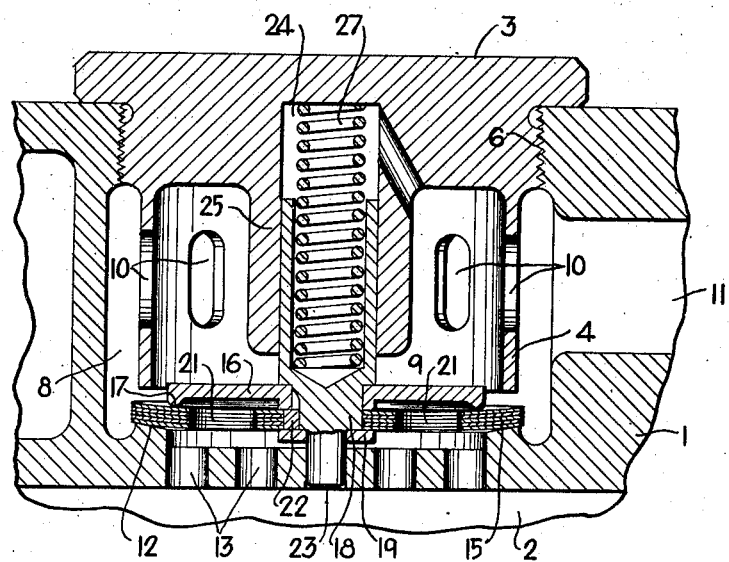
Figure 2:
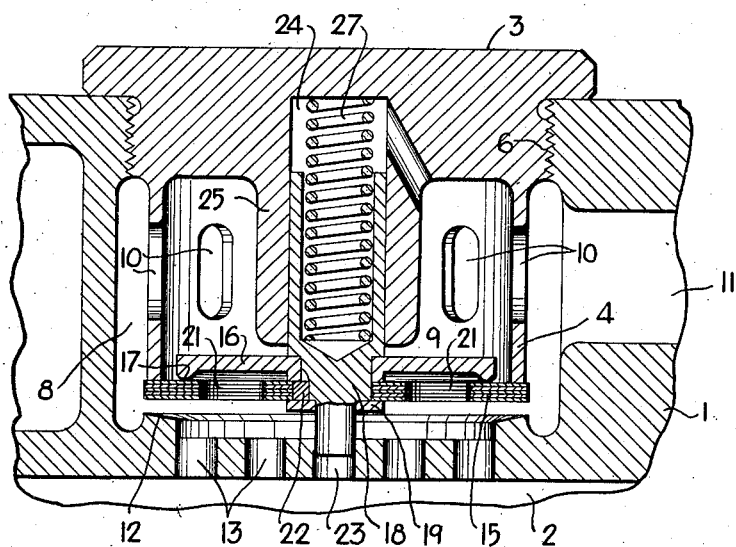

Other objects and advantages of my invention will be apparent from the following description of a preferred embodiment thereof in the form of a compressor discharge valve mechanism, as illustrated in the accompanying drawings, wherein: Fig. 1 is a vertical sectional view of the discharge valve portion of a compressor embodying my invention; Figs. 2 and 3 are views similar to Fig. 1 but showing other positions of the discharge valve mechanism; Fig. 4 is a side view of an auxiliary valve member forming part of the discharge valve mechanism; Fig. 5 is a face view of the member shown in Fig. 4; and Figs. 6 and 7 are side and face views, respectively, of a single lamina forming part of the flexible laminated valve member of the discharge valve mechanism.

Referring to the drawings, the reference character 1 indicates a portion of the cylinder head of a fluid compressor, which may be of the usual form having a fluid compressing piston (not shown) which is operative in the well known manner to compress fluid in the compression chamber, indicated at 2.

According to my invention, the discharge valve mechanism is mounted in the compressor head 1 and comprises a cylindrical body 3, one end of which forms a hollow cage portion 4 and is adapted to be piloted through an opening in the compressor head, said body having an annular threaded portion 6 adapted to be turned into screw-threaded engagement with said head so as to form a tight joint. The cage portion 4 extends into a valve chamber 8 formed in the compressor head, which valve chamber is open to the chamber 9 within the cage portion through a plurality of apertures 10 therein, and is connected with the usual discharge or delivery passage 11, the lower rim of said cage portion being spaced from and in coaxial alignment with an annular seat rib 12, which is provided on the compressor head 1 within the valve chamber 8. The seat rib 12 has an inwardly sloping seating face, and surrounds a number of apertures 13 formed in the compressor head for providing communication between the compression chamber 2 and the valve chamber 8.

For controlling communication from the compression chamber 2 to the discharge passage 11 there is provided a valve assembly which comprises a flexible main valve member 15 having its outer margin interposed between the seat rib 12 and the rim of the cage portion 4, an auxiliary valve member 16 arranged within said cage portion adjacent to and overlapping the main valve member, and having an annular bead 17 on the margin thereof adapted normally to engage said main valve member, and a guide stem 18 for carrying said valve members, the middle portion of said stem being suitably formed to fit the central openings provided in the valve members and adapted to receive a clamping ring 19, which may be fixed thereto in any suitable manner for securing said elements of the valve assembly together.

The main valve member 15 consists of a plurality of similarly formed thin metal plates 20 having a number of equally spaced apertures 21 therethrough, said plates being mounted on the guide stem 18 in registered alignment and prevented from turning by the key 22 fitted into suitable keyways as shown in the drawings. It will be noted that the bead 17 of the auxiliary valve member 16 holds the lower area thereof slightly spaced from the main valve member, so that said area is exposed to fluid pressure by way of the apertures 21 in said main valve member.

The lower end of the guide stem 18 is slidably mounted in a bore 23 formed in the compressor head 1, the upper and larger end being slidably mounted in a bore 24 in the sleeve portion 25 of the body 3, which projects from the body concentrically within the cage portion 4. Contained in the bore 24 is a coil spring 27, which is interposed between the body 3 and the guide stem 18 for urging said stem, the auxiliary valve member 16 and the main valve member 15 downwardly so that said main valve member normally engages the seat rib 12.

When the compressor is operated at a slow speed, fluid compressed in the chamber 2 will flow through the apertures 13 and act against the valve members 15 and 16, forcing the valve assembly upwardly against the pressure of the spring 27 until the main valve member 15 engages the rim of the cage portion 4 as shown in Fig. 2 so as to permit fluid under pressure to flow past the unseated valve to the valve chamber 8 and thence through the discharge passage 11. Upon the discharge of fluid under pressure from the compression chamber 2, spring 27 is permitted to move guide stem and valve members downwardly, the main valve member 15 engaging the seat rib 12. As the valve mechanism is thus operated, the main valve member 15 is adapted, particularly by reason of its resilience and laminated construction, to minimize any sound due to its alternate engaging of the seat rib 12 and the cage portion 4, so that said valve mechanism will function in a substantially noiseless manner.

It will be noted that the main valve member 15 in being moved toward the inwardly sloping seating face of the seat rib 12, first engages the outer edge thereof and is then gradually distorted or flexed in the region of its outer margin due to the pressure of the seating bead 17 of the auxiliary valve member 16, as shown in Fig. 1 of the drawings, the peripheral portion of said main valve member being pressed with a sliding movement into engagement with the inclined area of the seating face, thereby effecting a wiping action for cleaning said seating face. Since the main valve member 15 is subject to stress when flexed into engagement with the dished seating face of the seat rib 12, said member tends to straighten, and is adapted gradually to disengage said seating face from the inner edge toward the periphery thereof as the pressure of fluid compressed in chamber 2 approaches the degree sufficient to overcome the back pressure in the valve chamber 8, thus increasing the pressure area of the main valve member exposed to said chamber, so that said valve member will thereby be quickly unseated in response to a relatively light differential in the fluid pressures acting thereon.

When the compressor is operated at high speed, the fluid compressed in the chamber 2 is supplied through the apertures 13 at such a rate as to force the valve assembly upwardly until the auxiliary valve member 16 engages the lower end of the sleeve portion 25, the main valve member 15 being bent away from the bead 17 of said auxiliary valve member by engagement with the cage portion 4, as shown in Fig. 3 of the drawings. In this position of the discharge valve device, additional flow channels are established from the apertures 13 by way of the apertures 21 in the main valve member 15, past the unseated auxiliary valve member 16, and through the chamber 9, apertures 19 and valve chamber 8 to the discharge passage 11. It will be apparent that, since the apertures 21 permit fluid pressure to act on both sides of the laminated main valve member, said member is always substantially free from strain due to the pressure of fluid.

From the foregoing description it will be seen that I have provided an improved compressor valve device of moderate cost, which is adaptable for controlling either the inlet communication or the discharge communication of a compressor, and embodies features permitting quiet and efficient operation, and which is automatically operative to vary the flow area of the communication controlled.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A valve mechanism for a fluid compressor comprising a flexible main valve member having an opening therethrough, an auxiliary valve member adapted to engage said main valve member and controlling communication through said opening, a stem adapted to carry said main valve member and said auxiliary valve member, a valve seat adapted to be engaged by the main valve member, yielding means acting on said stem for biasing said main valve member toward its seat, and means adapted to be engaged by the peripheral portion of said main valve member on movement of said main valve member away from its seat, said main valve member being adapted to yield for permitting continued movement of said stem to unseat said auxiliary valve member, to thereby open communication through said opening.

2. In a discharge valve device for a fluid compressor having a compression chamber, in combination, a normally flat valve member comprising a plurality of laminated flexible plates and having one or more apertures therethrough, a rigid auxiliary valve member overlapping the apertures in said main valve member, said auxiliary valve member being centrally secured to said main valve member and having a circumferential bead normally in engagement therewith, a valve seat having a dished seating face, a spring arranged to act on the auxiliary valve member for flexing said main valve member into sealing engagement with said seat, and means engageable by the main valve member upon movement of said main valve member away from its seat for permitting continued movement of the auxiliary valve member to flex said main valve member for thereby opening the apertures therein.

3. A fluid discharge valve mechanism comprising a flexible main valve member having an opening therethrough, a seat for said member, an auxiliary valve member engaging said main valve member and controlling communication through said opening, means for securing the central portions of said valve members together, and an element engageable by said main valve member when moved away from its seat, the main valve member being flexed upon engagement thereof with said element by fluid pressure acting on said main valve member to permit continued movement of the auxiliary valve member to thereby open communication through said opening for the flow of fluid.

4. The combination with a casing having a chamber through which fluid under pressure is permitted to flow, of valve mechanism comprising a valve seat, a flexible main valve member in said chamber having one or more apertures therethrough and adapted to engage said seat, an auxiliary valve member overlapping the apertures in said main valve member and seated thereon, means for securing the central portions of said valve members together, an element adapted to engage the peripheral portion of the main valve member on movement of said main valve member away from said valve seat, and biasing means for urging said main valve member toward its seated position, the main valve member being yieldable away from the auxiliary valve member to open the apertures in said main valve member upon engagement thereof with said element.

5. The combination with a casing having a chamber through which fluid under pressure is permitted to flow, of fluid pressure operated valve mechanism including a main valve member comprising a plurality of laminated flexible plates having an opening therethrough, a valve seat, a spring adapted to urge the main valve member into engagement with said seat, means engageable by said main valve member upon movement of said main valve member away from its seat, and an auxiliary valve member centrally secured to and normally closing the opening in said main valve member, said auxiliary valve member being movable by fluid under pressure to flex the main valve member upon engagement of said main valve member with said means to open communication for the flow of fluid under pressure through said opening.

6. The combination with a casing having a chamber through which fluid under pressure is permitted to flow, of fluid pressure operated valve mechanism including a main valve member comprising a plurality of laminated flexible plates having an opening therethrough, a valve seat, a spring adapted to urge the main valve member into engagement with said seat, means engageable by said main valve member upon movement of said main valve member away from its seat, and an auxiliary valve member centrally secured to said main valve member, said auxiliary valve member overlapping the apertures in said main valve member and having a circumferential bead normally in seating engagement therewith, said main valve member being yieldable upon engagement with said means to permit unseating movement of said auxiliary valve member.

7. A discharge valve device, comprising a body having a valve seat, an apertured cylindrical portion mounted in said body and extending in alignment with and spaced from the valve seat, a movable guide stem, a flexible laminated main valve member mounted on said stem and having its peripheral portion interposed between said valve seat and said cylindrical portion, said main valve member having one or more apertures therethrough, an auxiliary valve member secured to said stem and adapted to engage the main valve member for normally closing the apertures therein, and a spring for biasing the main valve member toward the valve seat, said main valve member being movable by fluid under pressure to first engage said cylindrical portion and then flex to permit further movement of said stem to cause said auxiliary valve member to open the apertures in said main valve member and permit flow of fluid through said apertures.

8. A valve device for a fluid compressor, comprising a member having an annular dished valve seat, a laminated valve member having a plurality of radially spaced apertures and a peripheral seating portion adapted to be flexed into engagement with the sloping area of said seat, an auxiliary valve member overlapping said apertures and adapted to engage said laminated valve member substantially adjacent the seating portion thereof, whereby both valve members are urged toward seated position by pressure acting on one side of said auxiliary valve member, the gradual displacement of the seated area of said laminated valve member from sealing engagement with said valve seat being effected upon application of fluid pressure by way of said apertures to the opposite side of the auxiliary valve member, thereby gradually increasing the pressure area acted upon by said fluid pressure, and means engageable by said laminated valve member upon movement thereof away from said seat for permitting further movement of said auxiliary valve member out of engagement with said laminated valve member.

9. A discharge valve device for a fluid compressor comprising a casing having an annular valve seat thereon, a yieldable main valve member movable into and out of engagement with said seat, said main valve member being formed of a plurality of flexible disc-like laminae and having a series of circumferentially spaced groups of co-centrically aligned apertures therein, a rigid auxiliary valve member centrally secured to and movable with said main valve member, said auxiliary valve member being adapted to overlap and normally close said apertures, and annular means engageable by the peripheral portion of the main valve member upon movement of said main valve member away from its seat, whereby the apertured portion of said main valve member is adapted to be flexed away from said auxiliary valve member for opening said apertures.

10. In a discharge valve mechanism for a fluid compressor, a casing having an annular seat thereon, a flexible main valve having one face adapted to engage said seat, said valve having an opening therethrough, a substantially rigid auxiliary valve centrally secured to said main valve and engaging the other face thereof for closing the opening therethrough, and stop means adapted to be engaged by said main valve upon movement thereof from said seat, whereby said main valve is adapted to be flexed and said auxiliary valve moved away from said other face.

11. In a discharge valve mechanism for a fluid compressor, a casing having an annular seat thereon, a substantially circular flexible main valve having one face adapted to engage said seat, said main valve having openings therein located radially inwardly of said seat, a substantially rigid auxiliary valve associated with said main valve and engaging the other face thereof for closing the openings therethrough, means for securing the central portions of the main and auxiliary valves together, and means for flexing said main valve away from said auxiliary valve when said main valve is moved out of its seated position.

12. In a discharge valve mechanism for a fluid compressor, a casing having an annular seat thereon, a substantially circular flexible main valve having one face adapted to engage said seat, said main valve having openings therein located radially inwardly of said seat, a substantially rigid auxiliary valve associated with said main valve, said auxiliary valve having a portion thereon adjacent the periphery thereof adapted to seat on the other face of the main valve radially outwardly of the openings therein to close communication therethrough, means for securing the central portions of the main and auxiliary valves together, and means for flexing said main valve away from said auxiliary valve when said main valve is moved out of its seated position.

13. In a discharge valve mechanism for a fluid compressor, a casing having an annular seat thereon, a substantially circular flexible main valve having one face adapted to engage said seat, said main valve having openings therein located radially inwardly of said seat, a substantially rigid auxiliary valve associated with said main valve and engaging the other face thereof for closing the openings therethrough, means for securing the central portions of the main and auxiliary valves together, and means adapted to be engaged by the peripheral portion of the main valve to limit movement of the marginal portion of said main valve away from said seat.

14. In a discharge valve mechanism for a fluid compressor, a casing having an annular seat thereon, a substantially circular flexible main valve having one face adapted to engage said seat, said main valve having openings therein located radially inwardly of said seat, a substantially rigid auxiliary valve associated with said main valve, said auxiliary valve having a portion thereon adjacent the periphery thereof adapted to seat on the other face of the main valve radially outwardly of the openings therein to close communication therethrough, means for securing the central portions of the main and auxiliary valves together, and means adapted to be engaged by the peripheral portion of the main valve to limit movement of the marginal portion of said main valve away from said seat.

15. In a discharge valve mechanism for a fluid compressor, in combination, a casing having a seat having a substantially annular frusto-conical face thereon, a main valve comprising a flexible disc having a face adapted to seat on said seat, said disc having openings therein radially inwardly of said seat, an auxiliary valve centrally secured to said main valve and comprising a substantially rigid member having an annular portion thereon adapted to engage the other face of the main valve radially outwardly of the openings therein and radially inwardly of the said seat, and means for flexing said main valve upon movement thereof from said seat, whereby said annular portion of the auxiliary valve is disengaged from said main valve.

BURTON S. AIKMAN.